(12) United States Patent
Kumar et al.

(10) Patent No.: US 9,102,215 B2
(45) Date of Patent: Aug. 11, 2015

(54) AIRFLOW CONTROL IN FLOOR MODE FOR VEHICLE WITH MULTIPLE SEATING ROWS

(75) Inventors: Mukesh Kumar, Canton, MI (US); Paul B. Hoke, Plymouth, MI (US); Martha E. Nefcy, Dearborn, MI (US); David Wong, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 783 days.

(21) Appl. No.: 13/274,729

(22) Filed: Oct. 17, 2011

(65) Prior Publication Data

US 2013/0092364 A1 Apr. 18, 2013

(51) Int. Cl.
*B60H 1/00* (2006.01)
*F28F 27/00* (2006.01)
*F24F 11/00* (2006.01)

(52) U.S. Cl.
CPC ........ *B60H 1/00842* (2013.01); *B60H 1/00021* (2013.01); *B60H 1/00735* (2013.01); *B60H 1/00742* (2013.01); *F24F 11/001* (2013.01); *F24F 11/0012* (2013.01); *F24F 11/0034* (2013.01); *B60H 2001/002* (2013.01)

(58) Field of Classification Search
CPC ........... B60H 1/00842; B60H 1/00742; B60H 2001/002; B60H 1/00021; B60H 1/00735; F24F 11/001; F24F 11/0012; F24F 11/0034
USPC ........................ 165/42, 43, 203, 237; 62/244
See application file for complete search history.

(56) References Cited

U.S. PATENT DOCUMENTS

| | | | |
|---|---|---|---|
| 5,001,905 A * | 3/1991 | Miyazaki | 62/244 |
| 5,878,809 A | 3/1999 | Heinle | |
| 6,454,178 B1 * | 9/2002 | Fusco et al. | 236/49.3 |
| 6,598,665 B2 * | 7/2003 | Schwarz | 165/42 |
| 2007/0114292 A1 * | 5/2007 | Breed et al. | 236/49.3 |
| 2009/0038774 A1 * | 2/2009 | Ogiso et al. | 165/42 |
| 2010/0072290 A1 * | 3/2010 | Dage | 236/51 |
| 2011/0082594 A1 | 4/2011 | Dage et al. | |

* cited by examiner

*Primary Examiner* — Marc Norman
*Assistant Examiner* — Jon T Schermerhorn
(74) *Attorney, Agent, or Firm* — Vichit Chea; MacMillan, Sobanski & Todd, LLC

(57) ABSTRACT

A comfort system is provided for a motor vehicle. A seat occupancy sensor determines whether a third row zone is occupied. At least one flow controller is provided in the floor duct for controllably supplying the conditioned airflow to at least the third row outlet. If the third row zone is occupied, then a second row outlet and the third row outlet are turned on to supply a conditioned airflow to a front seat zone, a second row zone, and the third row zone. If the third row zone is not occupied, then the third row outlet is closed off. If the second row zone is not occupied, then the second and third row outlets are closed off. If occupied, then the second row outlet is turned on until a desired comfort level is achieved in the second row zone.

12 Claims, 2 Drawing Sheets

AIRFLOW CONTROL IN FLOOR MODE FOR VEHICLE WITH MULTIPLE SEATING ROWS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to climate control systems for motor vehicles, and, more specifically, to efficient use of a floor-mode conditioned airflow.

Fuel efficiency and cost are important decision factors when purchasing a new vehicle. On the other hand, purchasers also want a climate control system that provides good comfort for the occupants with the ability to quickly warm up or cool down upon entering the vehicle. Meeting this demand becomes especially challenging for larger vehicles such as minivans and crossover models having more than two rows of seating.

For any particular model of vehicle (i.e., a platform), the manufacturer may produce several variants with different levels of content and sold at correspondingly different prices. For a platform with second and third rows of seating, an auxiliary HVAC case dedicated to providing a conditioned airflow to the rear seats may be provided as an option. A lower cost version may also be provided without the auxiliary HVAC, in which case heating ducts feeding conditioned airflow from the main HVAC case in the front of the vehicle to the second and third rows is usually provided. The heated or cooled air always flows to all of the first, second, and third row floor outlets front HVAC, thereby fully loading the front HVAC unit regardless of whether all the rows are occupied. This results in inefficient use of energy and causes the burning of extra fuel and/or extra electrical consumption from the battery. It would be desirable to optimize energy usage while providing for greater thermal comfort and performance.

SUMMARY OF THE INVENTION

In one aspect of the invention, a comfort system is provided for a motor vehicle, wherein the vehicle includes a passenger cabin with a front seat zone, a second row zone, and a third row zone, and wherein the vehicle includes at least one seat occupancy sensor for determining at least whether the third row zone is occupied. The sensor could be one or more of the following and other known equivalents: weight sensor, capacitive sensor, optical sensor, infrared sensor, seat buckle sensor, door sensing switch, or a manually controlled switch (such as a heated seat control switch or an occupancy indicator switch). A main blower drives an airflow. A heat exchanger (such as a heater core, evaporator, or a PTC or ceramic heater) exchanges heat with the driven airflow and outputs a conditioned airflow. A front register delivers at least a portion of the conditioned airflow to the front seat zone. A rear duct includes a second row outlet for delivering at least a portion of the conditioned airflow to the second row zone and a third row outlet for delivering at least a portion of the conditioned airflow to the third row zone. At least one flow controller is provided in the rear duct for controllably supplying the conditioned airflow to at least the third row outlet. A comfort controller is coupled to the seat occupancy sensor and to the flow controller for detecting whether the third row zone is occupied. If the third row zone is occupied, then the second row outlet and the third row outlet are turned on to supply conditioned airflow to the front seat zone, the second row zone, and the third row zone. If the third row zone is not occupied, then the third row outlet is closed off. It is detected whether the second row zone is occupied. If the second row zone is not occupied, then the second and third row outlets are closed off to supply conditioned airflow to only the front seat zone. If the second row zone is occupied, then the second row outlet is turned on to supply the conditioned airflow to only the front seat zone and the second row zone until a desired comfort level is achieved in the second row zone. If a chauffeur option is selected, the second row may be heated or cooled before the front row.

DETAILED DESCRIPTION OF PREFERRED EMBODIMENTS

Figure 1:
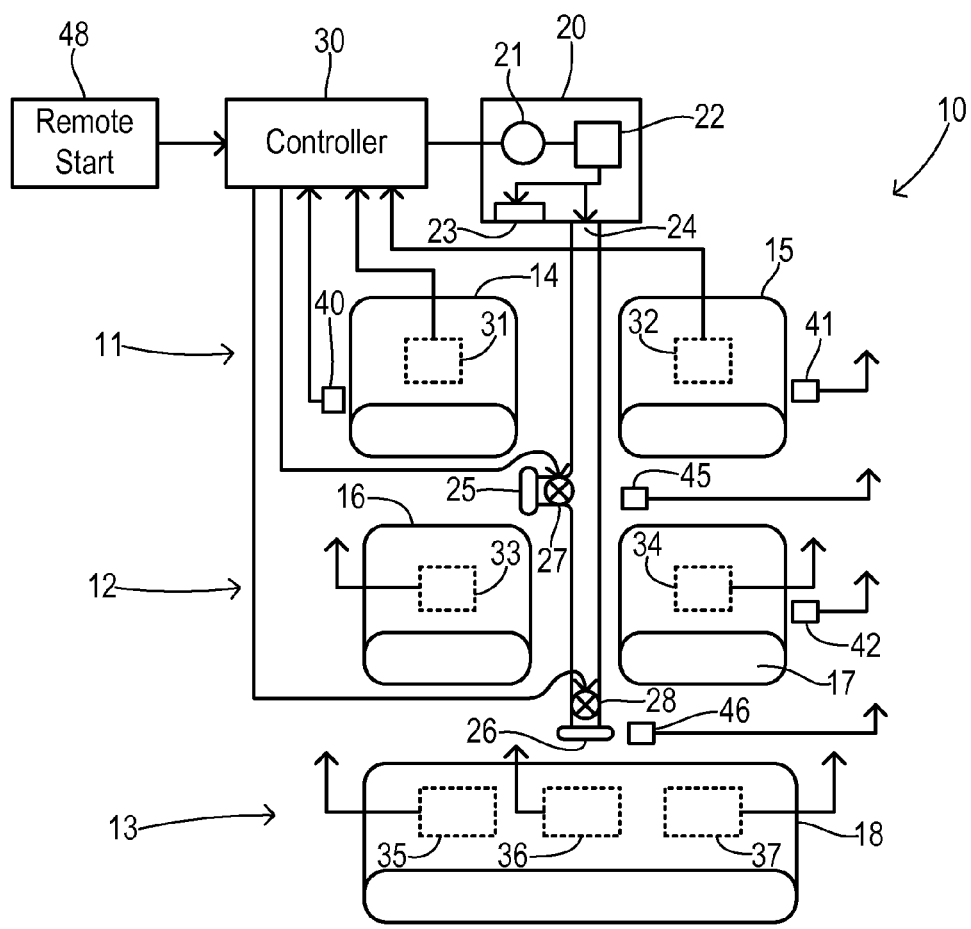
FIG. 1 is a diagram of passenger seating and comfort elements in a motor vehicle.

Referring now to FIG. 1, a passenger cabin 10 includes a front seat zone 11, second row zone 12, and third row zone 13. Front zone 11 includes a driver seat 14 and a front passenger seat 15. Second row zone 12 has passenger seats 16 and 17, which may comprise individual captain chairs, as shown, or may alternatively include a bench seat. Third row zone 13 is shown with a bench seat 18 for accommodating multiple occupants. An HVAC unit 20 includes a blower 21 and at least one heat exchanger 22 (such as an evaporator for cooling or a heater core for heating) to supply conditioned air to cabin 10 via a front register 23 and a rear duct 24. Front register 23 may be supplied via a separate duct. Alternatively, front register 23 could be fed off a common duct for supplying conditioned air flow to front seat zone 11 and the zones 12 and 13.

Rear duct 24 includes a second row outlet 25 and a third row outlet 26, each preferably supplying conditioned air to each respective zone in the area of the floor of cabin 10. In the embodiment shown in FIG. 1, each outlet 25 and 26 has an associated flow controller 27 and 28 which are coupled to a climate controller or comfort controller 30. Comfort controller 30 is connected to HVAC unit 20 for controlling an operational speed of blower 21 and other parameters of HVAC unit 20 as known in the art. Comfort controller 30 adjusts flow controllers 27 and 28 to selectably open or close outlets 25 and 26. When closed, the flow of conditioned air from HVAC unit 20 through duct 24 is closed off to the respective zone. Flow controllers 27 and 28 may be comprised of motor-controlled butterfly valves or other types of electrically-driven dampers as known in the art.

Controller 30 monitors a signal from at least one seat occupancy sensor for determining whether third row zone 13 is occupied. Preferably, all of the seating locations may include or be monitored by respective occupancy sensors. The occupancy sensors can be of the type normally incorporated in a conventional heated or cooled seat or may comprise a weight sensor as known in the art, either of which is depicted as seat occupancy sensors 31-37. Each sensor 31-37 provides a sensor signal to controller 30 for indicating whether each respective seat is occupied. Alternatively, occupancy sensing may be performed using sensors normally incorporated in a passenger restraint system such as a seatbelt or airbag system to provide an occupant detection signals to controller 30. Airbag or seatbelt sensors 40-42 are shown for seats 14, 15, and 17.

Additional sensors may include a second row comfort sensor 45 and a third row comfort sensor 46, which may be comprised of a temperature sensor and/or humidity sensor, or other remote sensor for detecting a thermal condition of an occupant (e.g., an infrared sensor). Comfort sensors 45 and 46 provide respective comfort signals to controller 30 for characterizing the temperature or other thermal characteristic associated with a respective row zone or seat location. An infrared sensor, for example, could characterize the skin temperature of an occupant to assess whether a particular comfort level is achieved.

FIG. 1 shows a remote start module 48 for communicating with a wireless transmitter carried by a driver for remotely starting an engine (not shown) prior to entering the vehicle. Remote start module 48 is coupled to comfort controller 30 for indicating the occurrence of a remote start state of the vehicle to enable improved window defrosting as is described below. The wireless transmission can also include a driver-configurable data signal identifying the number of passengers to be entering the vehicle so that the thermal condition of the respective zones can be properly conditioned during the start-up.

Figure 2:
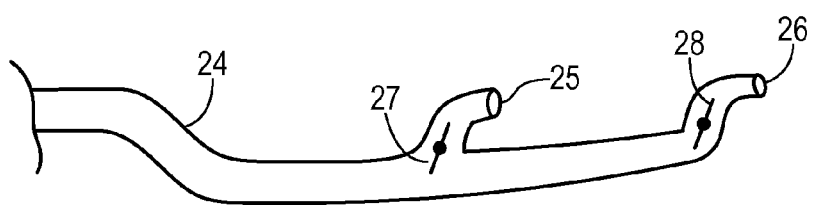
FIGS. 2-4 show respective embodiments of a floor duct for supplying a conditioned airflow to second and third rows of seating.
Figure 3:
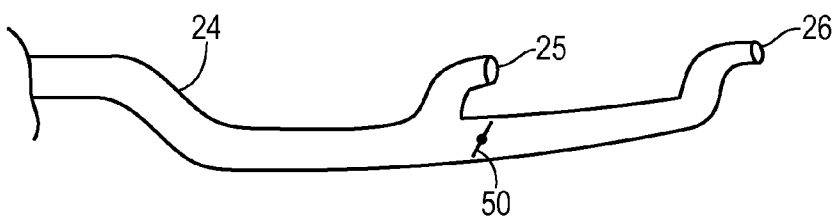
Figure 4:
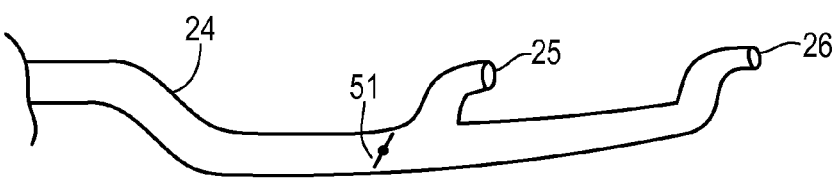

FIG. 2 shows one preferred embodiment of rear floor duct 24 wherein flow control actuators are provided for separately controlling air flow to the second and third rows. Specifically, rear floor duct 24 is connected to the HVAC unit for obtaining conditioned airflow and extends to second row outlet 25 and third row outlet 26. Within the duct, respective butterfly valves or other types of actuators are provided for flow controllers 27 and 28. FIG. 3 shows an alternative embodiment wherein a single flow controller 50 is located between outlet 25 and outlet 26 so that only third row outlet 26 can be closed off. In yet another embodiment shown in FIG. 4, a single flow controller 51 is placed in duct 24 upstream from second row outlet 25 so that both outlets are either opened or closed together. In each embodiment, the flow controller(s) could also be modulated or pulsed to varying the conditioned airflow delivered to the respective seat zones.

Figure 5:
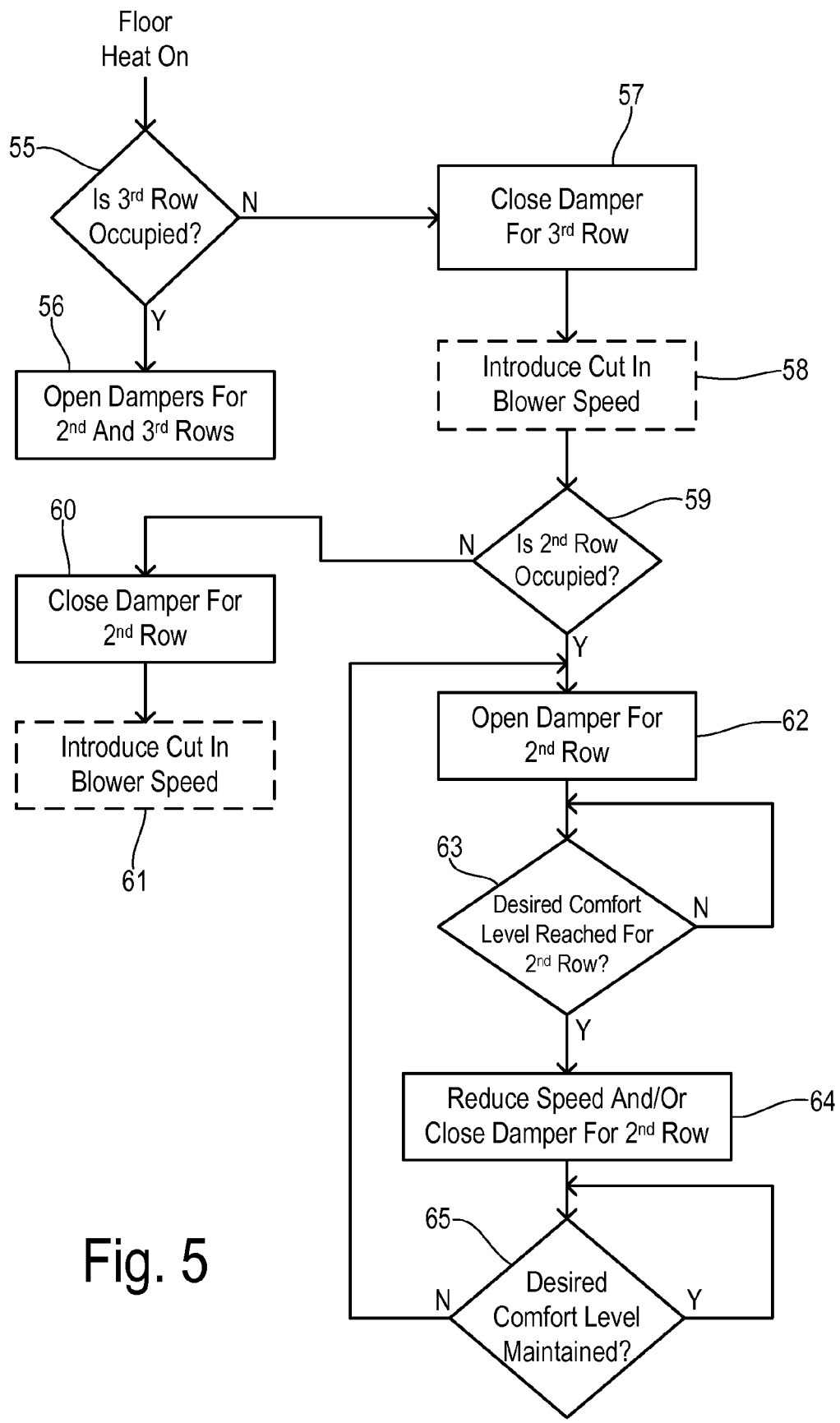
FIG. 5 is a flowchart showing one preferred method of the invention.

A preferred method of the invention is shown in FIG. 5. The method may be performed whenever zone heating or cooling has been activated. In step 55, a check is made to determine whether the third row is occupied. If so, then heating or cooling is allowed to flow to all rows. Therefore, dampers for the second and third rows are opened in step 56. Comfort is maximized and no reduced consumption of energy is achieved.

In the event that the third row is unoccupied, then a damper (i.e., flow controller) for the third row is closed in step 57. With the absence of airflow going to the third row, an optional cut in the main blower speed can be introduced in step 58. The cut can be a fixed speed reduction automatically introduced by the controller when it closes the damper for the third row, or the speed cut could be manually introduced by the driver or other occupant of the vehicle after they notice the extra airflow they start to receive once the third row damper is closed. Next, a check is made to determine whether the second seat row is occupied in step 59. If not occupied, then the maximum opportunity for energy savings is available and the damper for the second row of seats is closed in step 60. The blower speed can be optionally cut in step 61.

When the second row is occupied in step 59, the damper for the second row is opened in step 62. Energy savings may still be achieved once the desired heating or cooling is obtained for the second row. Thus, a check is made in step 63 to determine whether a desired comfort level has been reached in the second row zone. If not, then operation continues with the damper for the second row opened. Once the desired comfort level is reached, either the blower speed may be further reduced and/or the damper for the second row may be closed in step 64. A check is made in step 65 to determine whether the desired comfort level continues to be maintained. If so, then the method rechecks periodically for the desired comfort level. When the desired comfort level is no longer maintained, then a return is made to step 62 for opening the damper for the second row and/or increasing the blower speed to its previous level.

In an alternative embodiment, a chauffeur option may be initiated by a driver control (such as a remote start signal or a manually set dashboard switch) whereby thermal conditioning is initially provided to only the second row zone or the second and third row zones to maximize comfort for the passengers. In particular, the front register may be closed off in response to the chauffeur option.

What is claimed is:

1. A comfort system for a motor vehicle, wherein the vehicle includes a passenger cabin with a front seat zone, a second row zone, and a third row zone, and wherein the vehicle includes at least one seat occupancy sensor for determining at least whether the third row zone is occupied, the comfort system comprising;
   only one blower for driving an airflow, wherein the one blower drives the airflow to each of the front seat zone, the second row zone, and the third row zone;
   a heat exchanger for exchanging heat with the driven airflow and outputting a conditioned airflow;
   a front register for delivering at least a portion of the conditioned airflow to the front seat zone;
   a rear duct including a second row outlet for delivering at least a portion of the conditioned airflow to the second row zone and a third row outlet for delivering at least a portion of the conditioned airflow to the third row zone;
   at least one flow controller in the rear duct for controllably supplying the conditioned airflow to at least the third row outlet; and
   a comfort controller for coupling to the seat occupancy sensor and to the flow controller, the comfort controller configured for:
      detecting whether the third row zone is occupied;
      if the third row zone is occupied, then turning on the second row outlet and the third row outlet to supply conditioned airflow to the front seat zone, the second row zone, and the third row zone;
      if the third row zone is not occupied, then:
         closing off the third row outlet;
         detecting whether the second row zone is occupied;
         if the second row zone is not occupied, then closing off the second and third row outlets to supply conditioned airflow to only the front seat zone; and
         if the second row zone is occupied, then turning on the second row outlet to supply the conditioned airflow to only the front seat zone and the second row zone until a desired comfort level is achieved in the second row zone.

2. The comfort system of claim 1 including a second row flow controller and a third row flow controller, each comprising a damper selectably providing the conditioned airflow to the second row outlet and the third row outlet, respectively.

3. The comfort system of claim 2 wherein when the second row zone is occupied, then closing off the second row flow controller when the desired comfort level is achieved.

4. The comfort system of claim 1 wherein the comfort controller automatically introduces a reduction in the driven airflow in response to closing off of the second or third row outlets.

5. The comfort system of claim 1 further comprising a comfort sensor for detecting when the desired comfort level is reached.

6. The comfort system of claim 5 wherein the comfort sensor is comprised of a temperature sensor.

7. The comfort system of claim 5 wherein the comfort sensor is comprised of a remote sensor for detecting a thermal condition of an occupant.

8. The comfort system of claim 7 wherein the remote sensor is comprised of an infrared sensor.

9. The comfort system of claim 1 wherein the seat occupancy sensor includes a weight sensor for providing a weight signal to the comfort controller, and wherein the desired comfort level is set by the comfort controller in response to the weight signal.

10. The comfort system of claim 1 wherein the vehicle includes a remote start module for coupling with the comfort controller to indicate the occurrence of a remote start state of the vehicle, and wherein the comfort controller closes off the second and third row outlets in response to the remote start state.

11. The comfort system of claim 1 wherein the vehicle includes a remote start module for coupling with the comfort controller to indicate the occurrence of a remote start state of the vehicle with a chauffeur option, and wherein the comfort controller: overrides the occupancy sensor logic, turns on the second row outlet and the third row outlet, and closes off the front register in response to the chauffeur option.

12. A method for three-zone airflow control in a motor vehicle using a comfort system, wherein the vehicle includes a passenger cabin with a front seat zone, a second row zone, and a third row zone, at least one seat occupancy sensor for determining at least whether the third row zone is occupied, and a comfort system comprising: only one blower for driving an airflow, wherein the one blower drives the airflow to each of the front seat zone, the second row zone, and the third row zone; a heat exchanger for exchanging heat with the driven airflow and outputting a conditioned airflow; a front register for delivering at least a portion of the conditioned airflow to the front seat zone; a rear duct including a second row outlet for delivering at least a portion of the conditioned airflow to the second row zone, and a third row outlet for delivering at least a portion of the conditioned airflow to the third row zone; at least one flow controller in the rear duct for controllably supplying the conditioned airflow to at least the third row outlet; and a comfort controller for coupling to the seat occupancy sensor and to the flow controller; the method comprising:
 driving an airflow by the only one blower, wherein the blower drives the airflow past the heat exchanger;
 exchanging heat between the heat exchanger and the airflow to output the conditioned airflow for supplying the conditioned airflow to each of the front seat zone, the second row zone, and the third row zone;
 controllably blocking the conditioned airflow to each of the second row zone and the third row zone, using at least one flow controller in a duct;
 detecting occupancy in each of the second row and the third row by the seat occupancy sensor; and
 controlling the driven airflow using the comfort controller coupled to the seat occupancy sensor and the flow controller, whereby the method further comprises:
 detecting whether a third row zone is occupied;
  a) upon detecting the third row zone is occupied, then:
   opening the flow controller in the duct to a second row outlet and a third row outlet to supply conditioned airflow to the front seat zone, the second row zone, and the third row zone;
  b) upon detecting the third row zone is not occupied, then:
   closing the flow controller in the duct to the third row outlet, thereby blocking airflow to the third row outlet; and
 detecting whether the second row zone is occupied;
  i) upon detecting the second row zone is not occupied, then:
   closing the flow controller in the duct to the second and third row outlets to supply conditioned airflow to only the front seat zone; and
  ii) upon detecting the second row zone is occupied, then:
   opening the flow controller in the duct to the second row outlet to supply the conditioned airflow to only the front seat zone and the second row zone.

* * * * *